United States Patent [19]

Matsumoto et al.

[11] Patent Number: 4,525,125
[45] Date of Patent: Jun. 25, 1985

[54] PRESSURE RESPONSIVE PUMP CONTROL SYSTEM HAVING AN ALARM LAMP

[75] Inventors: Akio Matsumoto, Kanzaki; Mitsuyoshi Yokota, Ibo, both of Japan

[73] Assignee: Mitsubishi Denki Kabushiki Kaisha, Tokyo, Japan

[21] Appl. No.: 558,760

[22] Filed: Dec. 6, 1983

[30] Foreign Application Priority Data

Dec. 10, 1982 [JP] Japan ............... 57-187803[U]

[51] Int. Cl.³ ............... F04B 49/06; F04B 21/00; G08B 21/00
[52] U.S. Cl. ............... 417/44; 417/63; 340/60; 340/309.15; 340/626; 307/118
[58] Field of Search ............... 417/12, 38, 44, 63; 307/118; 340/626, 60, 611, 614, 309.15, 309.3

[56] References Cited

U.S. PATENT DOCUMENTS

| | | |
|---|---|---|
| 2,690,291 | 9/1954 | Taylor ............... 417/12 X |
| 3,050,003 | 8/1962 | Edwards ............... 417/12 |
| 3,469,528 | 9/1969 | East ............... 417/44 X |
| 3,473,549 | 10/1969 | Moyer ............... 417/12 X |
| 3,726,607 | 4/1973 | Garman ............... 417/12 |
| 3,914,755 | 10/1975 | Hook ............... 340/626 X |
| 4,171,932 | 10/1979 | Miller ............... 417/36 |
| 4,277,226 | 7/1981 | Archibald ............... 417/38 |
| 4,309,149 | 1/1982 | McCombs, Jr. ............... 417/63 |
| 4,359,716 | 11/1982 | Miyamaru et al. ............... 307/118 X |

FOREIGN PATENT DOCUMENTS

| | | | |
|---|---|---|---|
| 30501 | 3/1979 | Japan ............... | 417/63 |
| 36453 | 3/1979 | Japan ............... | 417/63 |
| 607655 | 9/1978 | Switzerland ............... | 340/626 |

Primary Examiner—William L. Freeh
Assistant Examiner—Paul F. Neils
Attorney, Agent, or Firm—Wenderoth, Lind & Ponack

[57] ABSTRACT

A pump control system has a vacuum pump driven by a DC motor to supply a negative pressure to a container first power and driving transistors which are interconnected to energize the DC motor, second power and driving transistors which are interconnected to turn an alarm lamp on, and a pressure sensor having a set of normally closed contacts which are connected to the first driving transistor and which are connected via a Zener diode to the second driving transistor; the contacts opened by at least a predetermined negative pressure within the container so as to immediately turn the first power transistor off and so as the second power transistor off with a time delay as determined by a parallel combination of a capacitor and a resistor connected to the Zener diode.

6 Claims, 3 Drawing Figures

PRESSURE RESPONSIVE PUMP CONTROL SYSTEM HAVING AN ALARM LAMP

BACKGROUND OF THE INVENTION

This invention relates to a control system for a pump, for example, a vehicular pump driven by a DC motor.

A conventional pump control system has comprised a vacuum pump driven by a DC motor to generate and supply a negative pressure to a container, a power and a driving transistor interconnected to drive and stop the DC motor in response to the operation of a first pressure sensor disposed on the container to sense a negative pressure within the container, a second pressure sensor disposed on the container to sense the negative pressure within the container, and an alarm lamp serially connected to the second pressure sensor.

Upon the start of an associated internal combustion engine, the alarm lamp is energized and the power and driving transistors have caused the vacuum pump to be driven through the DC motor so as to thereby gradually increase the negative pressure within the container in a negative direction. Upon the negative pressure reaching a first predetermined magnitude, the second pressure sensor has opened its set of normally closed contacts to deenergize the alarm lamp. Upon the negative pressure further increasing in the negative direction to reach a second predetermined magnitude, the first pressure sensor has opened its set of normally closed contacts to cause the vacuum pump to be stopped through the power and driving transistors and the DC motor. When the negative pressure has been negatively less than the second predetermined magnitude, the first pressure sensor has closed its set of now open contacts to again drive the vacuum pump as described above. Thus, the negative pressure within the container has negatively increased to the second predetermined magnitude resulting in the opening of the contact set of the first pressure sensor. The process as described above has been repeated to maintain the negative pressure within the container substantially at the second predetermined magnitude.

Upon the occurrence of a fault on the DC motor or the vacuum pump, the negative pressure within the container becomes negatively less than the first predetermined magnitude so as to cause the second pressure sensor to close its set of now open contacts. Thus, the alarm lamp has been turned on to indicate that fault.

The conventional pump control system as described above has been advantageous in that the system controls the operation of the DC motor and also the turn-on and -off of the alarm lamp to indicate the controlled status of the DC motor and therefore the vacuum pump but the system has been disadvantageous in that the two pressure sensors are required and therefore, the container is necessarily provided with two positions where the two pressure sensors are disposed respectively resulting in a complicated construction.

Accordingly it is an object of the present invention to provide a new and improved pump control system comprising a single pressure sensor and still retaining the advantages of the prior art practice as described above.

SUMMARY OF THE INVENTION

The present invention provides a pump control system comprising a DC motor, a pump driven by the DC motor to generate and supply a pressure to a container, a pressure sensor for sensing the pressure within the container controlled by the pump, and being operative with a predetermined pressure within the container, first circuit means responsive to the operation of the pressure sensor to drive the DC motor, timing circuit means controlled in response to the operation of the pressure sensor, an alarm lamp, and second circuit means responsive to an output from the timing circuit means to control the turn-on and -off of the alarm lamp.

In a preferred embodiment of the present invention the first circuit means may includes a first power transistor serially connected to the DC motor and a first driving transistor connected to the first power transistor so that one of the power and driving transistors is turned on while the other thereof is turned off, a second power transistor connected to a second driving transistor interconnected so that one of the second power and driving transistors is turned on while the other thereof is turned off, the second power transistor being serially connected to the alarm lamp, and the pressure sensor includes a set of normally closed contacts connected to the first driving transistor and via a Zener diode to the second driving transistor, the arrangement being such that, when the set of normally closed contacts is opened in response to at least a predetermined pressure, the first power transistor is turned off but the second power transistor is turned off with a time delay determined by a parallel combination of a capacitor and resistor connected to the second driving transistor through the Zener diode.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
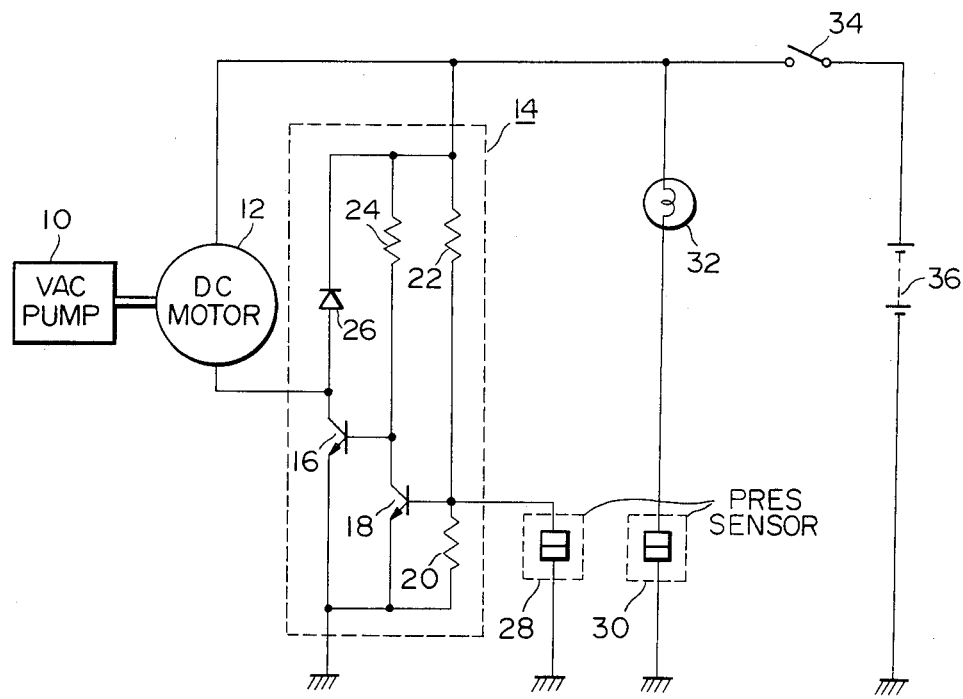
FIG. 1 is a circuit diagram of a conventional pump control system.

For a better understanding of the nature of the present invention, a conventional pump control system will now be described in conjunction with FIG. 1 of the drawings. The illustrated arrangement comprises a vacuum pump 10 disposed on a vehicle (not shown) to generate and supply a negative pressure to a container such as a brake booster or a reservoir tank (not shown) equipped on the vehicle, a DC motor 12 for driving the vacuum pump 10, and an electronic control circuit generally designated by the reference numeral 14 to control the operation of the DC motor 12 and therefore the vacuum pump 10. The electronic control circuit 14 comprises a common emitter NPN type power transistor 16 including a collector electrode connected in series to the DC motor 12, an emitter electrode connected to ground and a base electrode connected to a collector electrode of a common emitter NPN type driving transistor 18 having an emitter electrode connected to ground and a base electrode connected to the emitter electrode through a resistor 20. The driving transistor 18 has a base resistor 22 connected to the base electrode and the power transistor 16 has a base resistor 24 connected to base and collector electrodes respectively of the transistors 16 and 18. The junction of the resistors 22 and 24 is connected to the collector electrode of the power transistor 16 through a surge absorbing semiconductor diode 26, permitting a current to flow into the resistors 22 and 24 from the collector electrode of the power transistor 16.

The base electrode of the driving transistor 18 is further connected to a first pressure sensor 28 subsequently connected to ground. The first pressure sensor 28 is disposed on the container (not shown) so as to sense a negative pressure therein and has a set of normally closed contacts responsive to a first predetermined negative pressure within the container to be opened. A second pressure sensor 30 is connected between ground and an alarm lamp 32. The second pressure sensor 30 is disposed on the container to sense a negative pressure therein and has a set of normally closed contacts responsive to a second predetermined negative pressure within the container so as to be open. The second predetermined negative pressure is negatively less than the first predetermined negative pressure.

The alarm lamp 32 is connected to a key switch 34 which is subsequently connected to a positive terminal of a battery 36 having a negative terminal connected to ground. The junction of the alarm lamp 32 and the key switch 36 is connected to both the junction of the resistors 22 and 24 and the DC motor 12.

The operation of the arrangement shown in FIG. 1 will now be described with reference to FIG. 2 wherein there is illustrated the contact status of the pressure sensors 28 and 30 dependent upon a degree of vacuum of the container or a negative pressure in mmHg therein plotted on the axis of abscissas.

Figure 2:
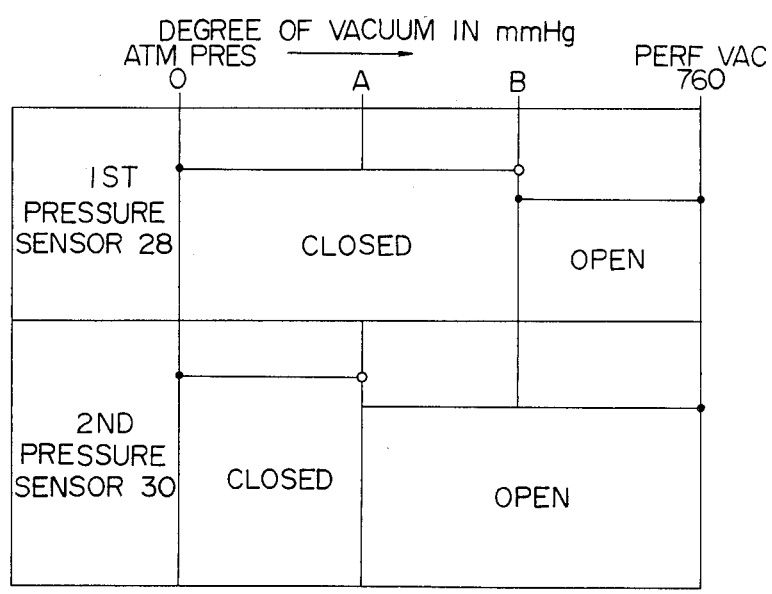
FIG. 2 is a diagram useful in explaining the operation of the arrangement shown in FIG. 1.

Before the start of an internal combustion engine (not shown), a negative pressure within the container is normally low and approximates the atmospheric pressure designated by the reference numeral 0 in FIG. 2 so that the sets of normally closed contacts of the pressure sensors 28 and 30 remain closed as shown in FIG. 2. At that time the key switch 34 is closed whereupon the alarm lamp 32 is turned on and the power and driver transistors 16 and 18 are conducting and non-conducting respectively. Thus, the battery 36 supplies an electric power to the DC motor 12 through the now closed key switch 34 and the now conducting power transistor 16 to drive the vacuum pump 10. This results in a gradual increase in negative pressure within the container. When the negative pressure reaches a first predetermined magnitude A (see FIG. 2), the second pressure sensor 30 opens its set of normally closed contacts as shown in FIG. 2. The opening of the set of contacts in the second pressure sensor 30 deenergizes the alarm lamp 32 serially connected thereto.

When the negative pressure is further increased in the negative direction to reach a second predetermined magnitude B (see FIG. 2), the first pressure sensor 28 opens its set of normally closed contacts as shown in FIG. 2. Thus, the driving transistor 18 is put in its conducting state while the power transistor 16 is put in its non-conducting state. Thus, the DC motor 12 is deenergized to stop the vacuum pump 10.

Under these circumstances, the internal combustion engine may be operated in the braking mode. At that time, the negative pressure within the container is negatively less than the second predetermined magnitude B as shown in FIG. 2. Thus, the first pressure sensor 28 closes its set of now open contacts to again drive the vacuum pump 10 by performing the abovementioned operation starting with the closure of the key switch 34. Accordingly, the negative pressure within the container increases negatively until it reaches the second predetermined magnitude B. At that time the first pressure sensor 28 opens its set of now closed contacts.

Thereafter, the process as described above is repeated to maintain the negative pressure within the container substantially at the second predetermined magnitude.

Upon the occurrence of a fault on the DC motor 12 or the vacuum pump 10, the negative pressure negatively decreases to reach the first predetermined magnitude A. At that time, the second pressure sensor 30 closes its set of now open contacts, resulting in the turn-on of the alarm lamp 32.

Conventional pump control systems such as described above have required a pair of pressure sensors, and therefore they have been disadvantageous in that the container is necessarily provided with two positions where the pair of pressure sensors are disposed respectively and that the resulting structure becomes complicated.

The present invention contemplates to elimination of the disadvantages of the prior art practice as described above.

Figure 3:
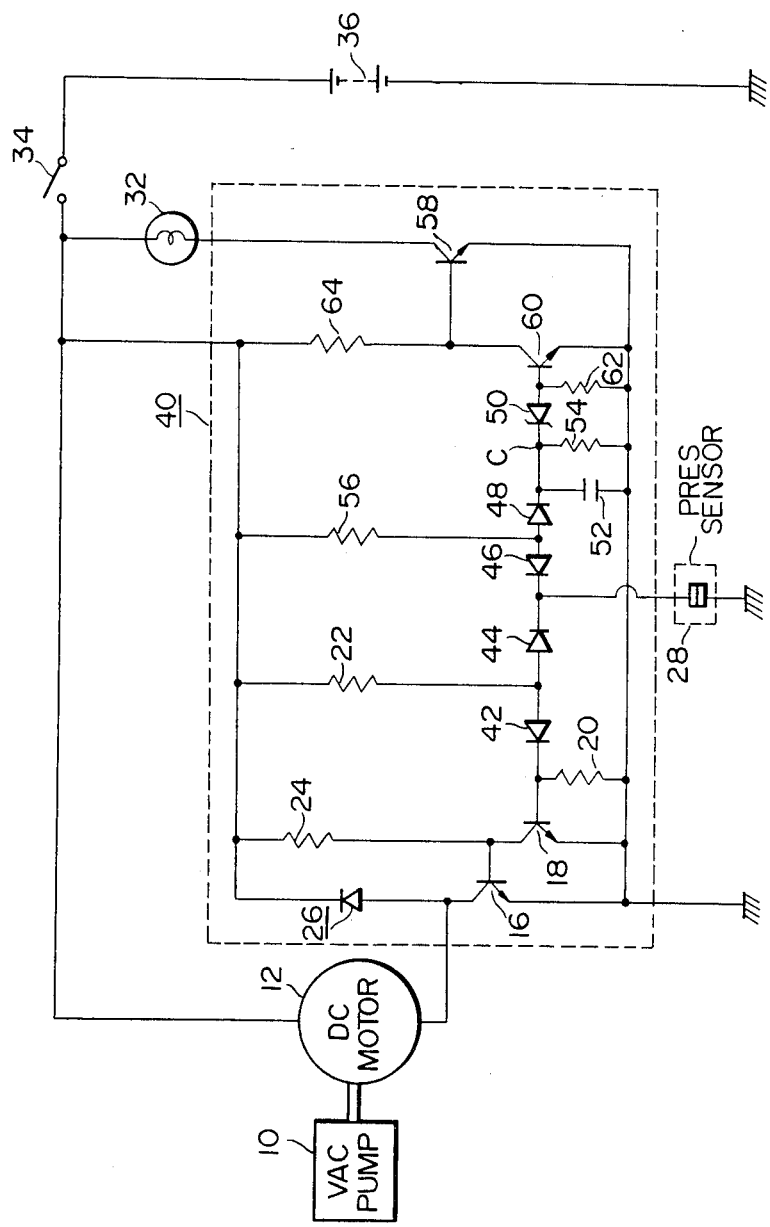
FIG. 3 is a circuit diagram of one embodiment according to the pump control system of the present invention.

In FIG. 3 wherein like reference numerals designate the components identical or corresponding to those shown in FIG. 1, there is illustrated one embodiment according to the pump control system of the present invention. The illustrated arrangement is different from that shown in FIG. 1 only in that in FIG. 3, an electronic control circuit generally designated by the reference numeral 40 is substituted for the electric control circuit 14 shown in FIG. 1 to control both the DC motor 12 and the alarm lamp 32 with the second pressure sensor omitted. The electronic control circuit 40 comprises a common emitter NPN type power transistor 16, a common emitter NPN type driving transistor 18, a surge absorbing semiconductor diode 26 and resistors 20 and 24 are interconnected in the same manner as described above in conjunction with FIG. 1. The base electrode of the driving transistor 18 is also connected to a series combination of a pair of semiconductor diodes 42 and 44 interconnected back to back, another pair of semiconductor diodes 46 and 48 interconnected back to back, and a Zener diode 50 serially connected to one another in the named order. Each pair of diodes 42 and 44 or 46 and 48 are operative to prevent a flow of reverse current therethrough and a pressure sensor 28 identical to the first pressure sensor 28 shown in FIG. 1 is connected between the junction of cathode electrodes of the diodes 44 and 46 and a grounded return lead while a parallel combination of a capacitor 52 and a resistor 54 is connected between the junction of cathode electrodes of the diode 48 and the Zener diode 50 and the return lead. The capacitor 52 and the resistor 54 form a timing circuit for holding a voltage on a point C (see FIG. 3).

Furthermore, the junction of anode electrodes of the diodes 42 and 44 is connected to a key switch 34 through a base resistor 22 of the driving transistor 18 and that of anode electrodes of the diodes 46 and 48 is connected also to a key switch 34 through a current limiting resistor 56 for limiting a charging current to the capacitor 52.

An alarm lamp 32 is connected to a collector electrode of a common emitter NPN type power transistor 58 having an emitter electrode connected to ground or the return lead and a base electrode connected to a collector electrode of a common emitter NPN type driving transistor 60 having an emitter electrode connected to the return lead and a base electrode connected to an anode electrode of the Zener diode 50 and also to the emitter electrode through a resistor 62 with the collector electrode connected to the key switch 34 through a collector resistor 64.

In other respects, the arrangement is identical to that shown in FIG. 1.

The operation of the arrangement shown in FIG. 3 will now be described. The pressure sensor 28 is operated to drive and stop the DC motor 12 and therefore the vacuum pump 10 in the same manner as described above in conjunction with FIGS. 1 and 2 with the power and driving transistors 16 and 18 respectively forming a first switching element with the associated components. Thus, the control of the alarm lamp 32 will now be described.

As in the arrangement of FIG. 1, the negative pressure within the container is negatively low and approximates the atmospheric pressure before the start of an associated internal combustion engine. Thus, the pressure sensor 28 maintains its set of normally closed contacts at closed position. Accordingly, even with the key switch 34 closed, the voltage at the point C is negatively low and corresponds to approximately the atmospheric pressure so as to maintain the Zener diode 50 in its non-conducting state. Thus, the driving transistor 60 is put in its non-conducting state while the power transistor 58 is put in its conducting state, permitting the alarm lamp 32 to be turned on.

On the other hand, the vacuum pump 10 is driven in the same manner as described above in conjunction with FIG. 1 to negatively increase the negative pressure within the container. Upon the negative pressure within the container exceeding the second predetermined magnitude B shown in FIG. 2 in the negative direction, the pressure sensor 28 opens its set of normally closed contacts. Thus, the voltage at the point C becomes high until the Zener diode 50 is conducting. At that time, the driving transistor 60 is put in its conducting state while the power transistor 58 is put in its non-conducting state resulting in the turn-off of the alarm lamp 32.

From the foregoing it is seen that the power and driving transistors 58 and 60 respectively with the associated components form a second switching element for the alarm lamp 32.

Under these circumstances, the internal combustion engine may be operated in the braking mode to negatively decrease the negative pressure within the container to be negatively less than the predetermined magnitude B shown in FIG. 2. This results in the pressure sensor 28 closing its set of now open contacts. However, the voltage at the point C is held at its high level within a time interval as determined by the magnitudes of the capacitor 52 and resistor 54 and therefore the alarm lamp 32 remains deenergized within that time interval while the vacuum pump 10 continues to be normally operated. Since the above-mentioned time interval is preset to be longer than a time interval required for the pressure sensor 28 to open its set of normally closed contacts, the alarm lamp 32 remains normally deenergized.

Under these circumstances, a fault may occur on the vacuum pump 10 or the DC motor 12. Alternatively, a leakage may be developed on associated piping, the container or the like. At that time the pressure sensor 28 senses that fault or leakage so as to cause its set of normally closed contacts to remain closed. Thus, the capacitor 52 terminates its discharge so as to decrease the voltage at the point C, resulting in the non-conduction of the Zener diode 50 and therefore of the driving transistor 60 and the conduction of the power transistor 58. As a result, the alarm lamp 32 is turned on, indicating a decrease in voltage at the point C or the fault or leakage as described above.

It is seen that the alarm lamp 32 also functions as indicating means for indicating the pressure state in the container.

From the foregoing it is seen that the present invention can provide an electronic control circuit for controlling the operation of the DC motor and the turn-on and -off of the alarm lamp indicating the controlled status of the DC motor by using only a single pressure sensor.

While the present invention has been illustrated and described in conjunction with a single preferred embodiment thereof, it is to be understood that numerous changes and modifications may be resorted to without departing from the spirit and scope of the present invention. For example while the present invention has been described in conjunction with a vacuum pump used with a brake booster it is to be understood that the same is equally applicable to vacuum pump used with the door opening closing device and compressors.

What is claimed is:

1. A pump control system comprising a DC motor, a pump driven by said DC motor to generate and supply a pressure to a container, a single pressure sensor for sensing a pressure within said container controlled by said pump, and being operative with a predetermined pressure within said container, a first circuit means responsive to the operation of said single pressure sensor to drive said DC motor, a timing, circuit controlled in response to the operation of said single pressure sensor, an alarm lamp, and a circuit means responsive to an output from said timing circuit means to control the turn-on and -off of said alarm lamp whereby said single pressure sensor provides the sole means for controlling said pump and said alarm lamp.

2. A pump control system as claimed in claim 1 wherein said pump comprises a vacuum pump and said single pressure sensor senses a negative pressure in said container.

3. A pump control system comprising a DC motor, a pump driven by said DC motor to generate and supply a pressure to a container, a single pressure sensor for sensing a pressure within said container controlled by said pump, said single pressure sensor being operative in response to a predetermined pressure within said container sensed thereby, an indicating means for indicating that said container is under a pressure not higher than said predetermined pressure, a first switching element serially connected to said pump and responsive to a pressure within said container not less than said predetermined pressure as sensed by said single pressure sensor to be turned off, a second switching element serially connected to said indicating means and responsive to a pressure within said container not less than said predetermined pressure as sensed by said single pressure sensor to be turned off and a timing circuit for delaying the turn-off of said second switching element whereby said single pressure sensor provides the sole means for controlling said pump and said indicating means.

4. A pump control system as claimed in claim 3 wherein said second switching element includes an input circuit provided with a Zener diode.

5. A pump control system as claimed in claim 3 wherein said timing circuit includes a parallel combination of a capacitor and a resistor.

6. A pump control system as claimed in claim 2 wherein said pump comprises a vacuum pump and said single pressure sensor senses a negative pressure in said container.

* * * * *